United States Patent [19]
Nishino et al.

[11] Patent Number: 5,627,636
[45] Date of Patent: May 6, 1997

[54] DISTANCE MEASURING EQUIPMENT

[75] Inventors: Jun Nishino; Katsuyuki Fukuda, both of Saitama, Japan

[73] Assignee: Kansei Corporation, Saitama, Japan

[21] Appl. No.: 391,347

[22] Filed: Feb. 21, 1995

[30] Foreign Application Priority Data

Feb. 23, 1994 [JP] Japan .................................. 6-025620
Jun. 21, 1994 [JP] Japan .................................. 6-139159
Dec. 28, 1994 [JP] Japan .................................. 6-328507

[51] Int. Cl.$^6$ .................................................. G01C 3/08
[52] U.S. Cl. ................................. 356/5.05; 356/5.01
[58] Field of Search ............................ 356/5.01, 5.1, 356/5.05, 5.06, 5.12, 5.13

[56]  References Cited

U.S. PATENT DOCUMENTS 4,403,857  9/1983  Holscher ........................... 356/5.13
4,490,036 12/1984  Anagnostopoulos .
4,521,106  6/1985  Lambeth .

*Primary Examiner*—Stephen C. Buczinski
*Attorney, Agent, or Firm*—Longacre & White

[57]  ABSTRACT

A distance measuring equipment which is useful in, for example, a collision prevention system wherein a laser beam is forward emitted from a vehicle to measure a distance between the vehicle and a forward vehicle, and an alarm is produced when the present vehicle abnormally approaches the forward vehicle. In the distance measuring equipment, when a correction instruction signal is supplied, a distance calculating circuit first drives an optically shielded light emitting element for correction to emit light, and produces a correction signal on the basis of a signal input into an adder connected to a light receiving element. Thereafter, the distance calculating circuit drives a light emitting element for measurement to emit light, and produces a distance measurement signal with referring the correction signal.

12 Claims, 8 Drawing Sheets

DISTANCE MEASURING EQUIPMENT

BACKGROUND OF THE INVENTION

1. Field of the Invention

The invention relates to a distance measuring equipment (so-called laser radar) which is useful in, for example, a collision prevention system wherein a laser beam is forward emitted from a vehicle to measure a distance between the vehicle and a forward vehicle, and an alarm is produced when the present vehicle abnormally approaches the forward vehicle.

2. Description of the Related Art

A distance measuring equipment of this kind will be described with reference to FIG. 7.

In FIG. 7, reference numeral 1 designates a clock signal generator which supplies a timing clock signal to various circuits, and 2 designates a light emission trigger signal generator which converts the clock signal supplied from the clock signal generator 1 into a light emission signal functioning as a trigger signal, on the basis of a control signal supplied from a distance calculating circuit 15 which will be described later. Reference numeral 3 designates a driving circuit which is powered by a power source circuit 4, and which, in response to the supply of the light emission signal from the light emission trigger signal generator 2, drives at each supply a light emitting element 5 to generate a laser beam. The power source circuit 4 supplies the power not only to the driving circuit 3 but also to the other circuits.

Reference numeral 6 designates a light transmitting lens through which the laser beam from the light emitting element 5 is output so as to diffuse away from the element 5 at a predetermined angle, and 8 designates a light emitting unit which comprises the driving circuit 3, the power source circuit 4, the light emitting element 5, the light transmitting lens 6, and the like.

Reference numeral 9 designates a honeycomb filter which is disposed so as to cover the front surface of the incidence plane of a light receiving lens 10. Among light beams reflected by an object (not shown) which is in front of the equipment such as a forward vehicle (hereinafter, such an object is referred to as "forward object"), only light beams which are parallel to the optical axis of the light receiving lens 10 are allowed to pass through the lens, and light beams which are not parallel to the optical axis are disabled to pass the lens. Reference numeral 11 designates a light receiving element which receives light beams converged by the light receiving lens 10 and converts them into an electric signal, 12 designates an amplifier which amplifies the light reception signal from the light receiving element 11 and outputs the amplified signal, and 13 designates a light receiving unit which comprises the honeycomb filter 9, the light receiving lens 10, the light receiving element 11, the amplifier 12, and the like.

Reference numeral 14 designates an adder. In the case where a period is defined between the supply of a control signal from the distance calculating circuit 15 and the next supply of the control signal, each time when the control signal is supplied, the adder 14 adds the waveform output from the amplifier 12 in the current period to that in the previous period so as to convert the light reception signal into a signal having an improved S/N ratio, and then outputs the signal. Specifically, when the control signal is supplied N times from the distance calculating circuit 15 to the light emission trigger signal generator 2 and the adder 14, the light emitting element 5 emits a laser beam the corresponding number of times, i.e., N times, and waveforms respectively produced by the emitting operations and including the light reception signals output from the amplifier 12 are added to each other. When the adding operations are completed, the calculation result in the current period is binarized and then output.

The distance calculating circuit 15 supplies to the light emission trigger signal generator 2 the control signal for causing the light emitting element 5 to emit light. Further, the distance calculating circuit 15 instructs the adder 14 to conduct the adding operations, by means of the control signal.

When receiving the waveform showing the binarized addition result from the adder 14, the distance calculating circuit 15 calculates the distance between the equipment and the forward object on the basis of the resulting waveform. Specifically, in the pulse string showing the addition result which has been binarized at predetermined temporal intervals, a first pulse having a width which is greater than a predetermined level is detected, and the distance is calculated on the basis of the period between the time when the control signal is output and that of the first pulse.

Next, the operation of the equipment described above will be described.

When the power source for the whole of the equipment is turned on, the distance calculating circuit 15 repeatedly outputs the control signal (see FIG. 8(A)) at intervals of a predetermined period T. Each time when the control signal is output, the light emitting element 5 generates a laser beam, and the laser beam is forward emitted through the light transmitting lens 6.

The laser beam is reflected by the forward object to return to the equipment, and then detected by the light receiving element 11 through the light receiving lens 10. The output of the light receiving element 11 is supplied to the adder 14 via the amplifier 12. In the adder 14, the output from the amplifier 12 is divided for the predetermined period T, and, each time when a signal is newly obtained, the new signal is added to the signal of the previous period. In other words, the waveforms of N periods are added to each other (see FIG. 8(B)).

This allows the weakened reflection beams, i.e., the laser beams to be extracted as the light reception signal from the output of the amplifier 12, so that the laser beam is subjected to the signal processing.

Then the adder 14 binarizes the addition result to convert it into a logic signal (see FIG. 8(C)). The logic signal is checked to see whether or not the probability of the period of the high level with respect to that of the low level is equal to or greater than 50% in a unit period which is obtained by further dividing the period T. If the probability is equal to or greater than 50%, periods t1 and t2 of the maximum pulse widths in the high-level periods wherein the probability is equal to or greater than 50% are detected (waveforms P1 and P2 in FIG. 8(D)). The detected data (see FIG. 8(D)) are supplied to the distance calculating circuit 15.

As a result, the distance calculating circuit 15 calculates the distance between the forward object and the equipment on the basis of the temporal difference T0 between the first timing P1, among the supplied data (see FIG. 8(D)), when the probability that the questioned pulse can be presumed a reflection signal is raised to 100%, and the timing when the distance calculating circuit 15 outputs the control signal. The calculated distance is supplied to an alarm judging circuit (not shown). When the distance enters a dangerous range, an alarm signal is produced. The second timing P2 when the probability is 100% is neglected.

In such a distance measuring equipment, however, a large current must be supplied when the light emitting element 5 such as a laser diode emits a light beam, and the light receiving element is required to have a high sensitivity. Each time when the light emitting element 5 emits a light beam, therefore, electric noise (see the portion Q1 of FIG. 8(B)) is superposed as a DC component on the output signal which is supplied from the amplifier 12 to the adder 14.

In the case where a signal (see the symbol Q2 of FIG. 8(B)) indicative of the reflection beam from the forward object and generated with being superposed on noise components close to white noise should originally be subjected to the signal processing so that the distance signal Td is detected as shown in FIG. 8(E), however, the adder 14 actually processes the noise portion Q1 as if it is a signal indicative of the reflection beam from the forward object. This results in that the distance is erroneously measured, thereby producing a problem in that the reliability of the measurement accuracy is lowered.

This problem may be solved by shielding the whole of the circuits or by disposing a noise filter in the power source circuit. When such a countermeasure is taken, however, the number of electronic parts is increased and the area for mounting these parts is enlarged and hence there arise further problems in that the production cost is increased, and that the equipment is too large to be used in a practical use.

SUMMARY OF THE INVENTION

The invention has been made in view of these problems. It is an object of the invention to provide a distance measuring equipment having a simple configuration in which noise components produced by light emission of a light emitting element can be eliminated and only a reflection signal is detected so that the accuracy of measuring a distance is improved.

In attaining the above object, the invention provides a distance measuring equipment including: a light emitting element for measurement; an optically shielded light emitting element for correction; timing means for generating a timing signal; light emission trigger signal generating means for receiving the timing signal from the timing means to generate a trigger signal; driving means for receiving the trigger signal from the light emission trigger signal generating means to drive the light emitting element for measurement to emit light; a light receiving element for receiving light emitted from the light emitting element for measurement and reflected by a forward object; adding means for conducting an adding operation a predetermined number of times on an output signal including a light reception signal from the light receiving element, during a period between reception of the timing signal from the timing means and next reception of the timing signal, and for binarizing and normalizing an addition result; and distance calculating means for calculating a distance between the equipment and the forward object on the basis of a waveform signal supplied from the adding means and the timing signal output from the timing means, wherein the timing means drives the optically shielded light emitting element for correction to emit light, through the light emission trigger signal generating means and the driving means, and corrects a signal due to the light reception signal from the light receiving element with using an input to the adding means at this time as a correction signal.

The invention also provides a distance measuring equipment including: a light emitting element; driving means for intermittently driving the light emitting element; switch means which is connected in parallel to the light emitting element; timing means for generating a timing signal; light emission trigger signal generating means for supplying the timing signal from the timing means to the driving means as a trigger signal; a light receiving element for receiving light emitted from the light emitting element and reflected by a forward object; adding means for, each time when receiving plural times the timing signal supplied from the timing means, conducting an adding operation on an output signal including the light reception signal from the light receiving element, in a period immediately before the reception, and for binarizing and normalizing an addition result; and distance calculating means for calculating a distance between the equipment and the forward object on the basis of a waveform signal supplied from the adding means and the timing signal output from the timing means, wherein the switch means is switched to be conductive in synchronization with the adding operation in the adding means, thereby setting the light emitting element to be a non-light emitting state, and a signal due to the light reception signal from the light receiving element is corrected with using an input to the adding means at this time as a correction signal.

DETAILED DESCRIPTION OF THE PREFERRED EMBODIMENTS

First Embodiment

Hereinafter, an embodiment of the invention will be described with reference to FIG. 1.

Figure 1:
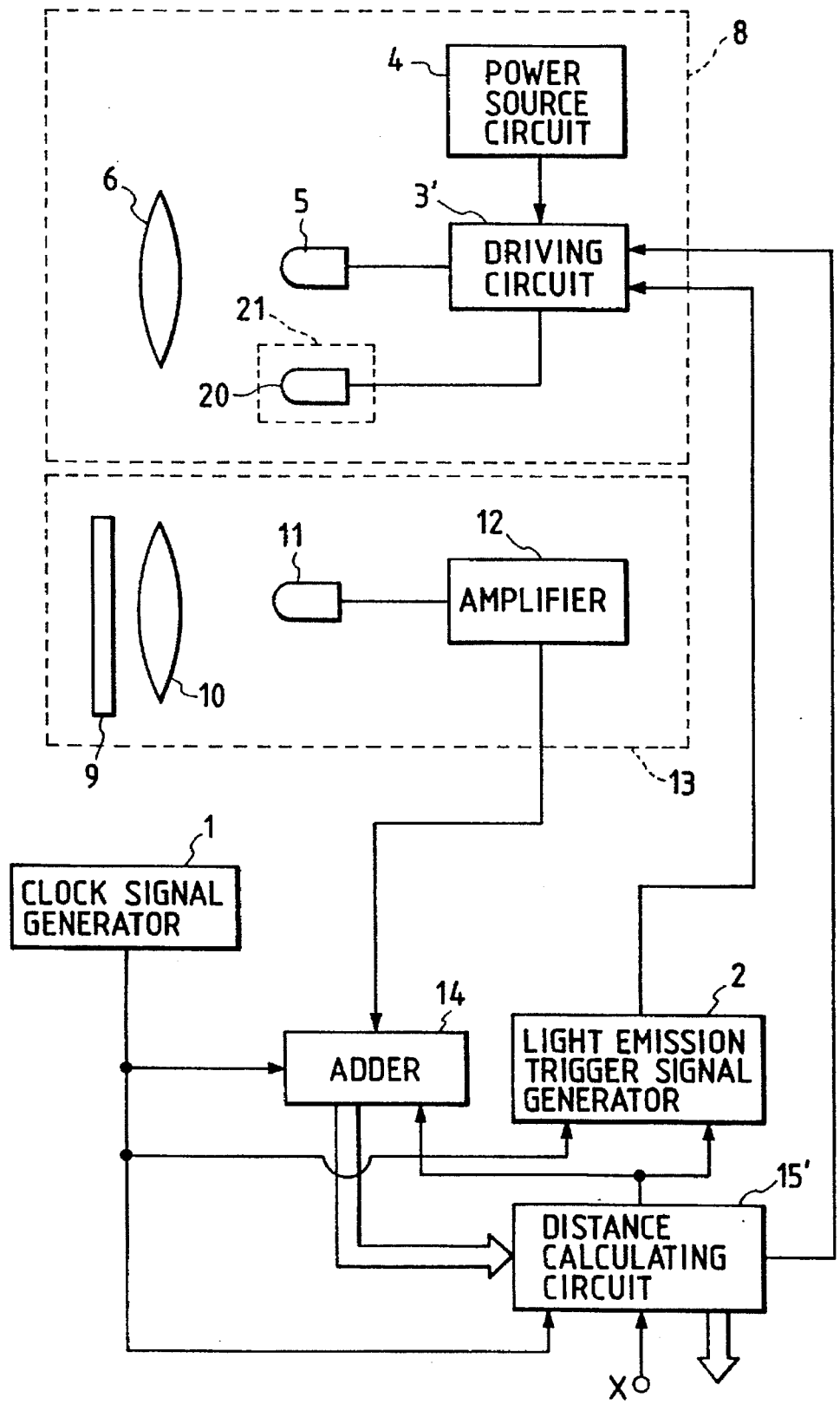
FIG. 1 is a block diagram showing a first embodiment of the invention.
Figure 7:
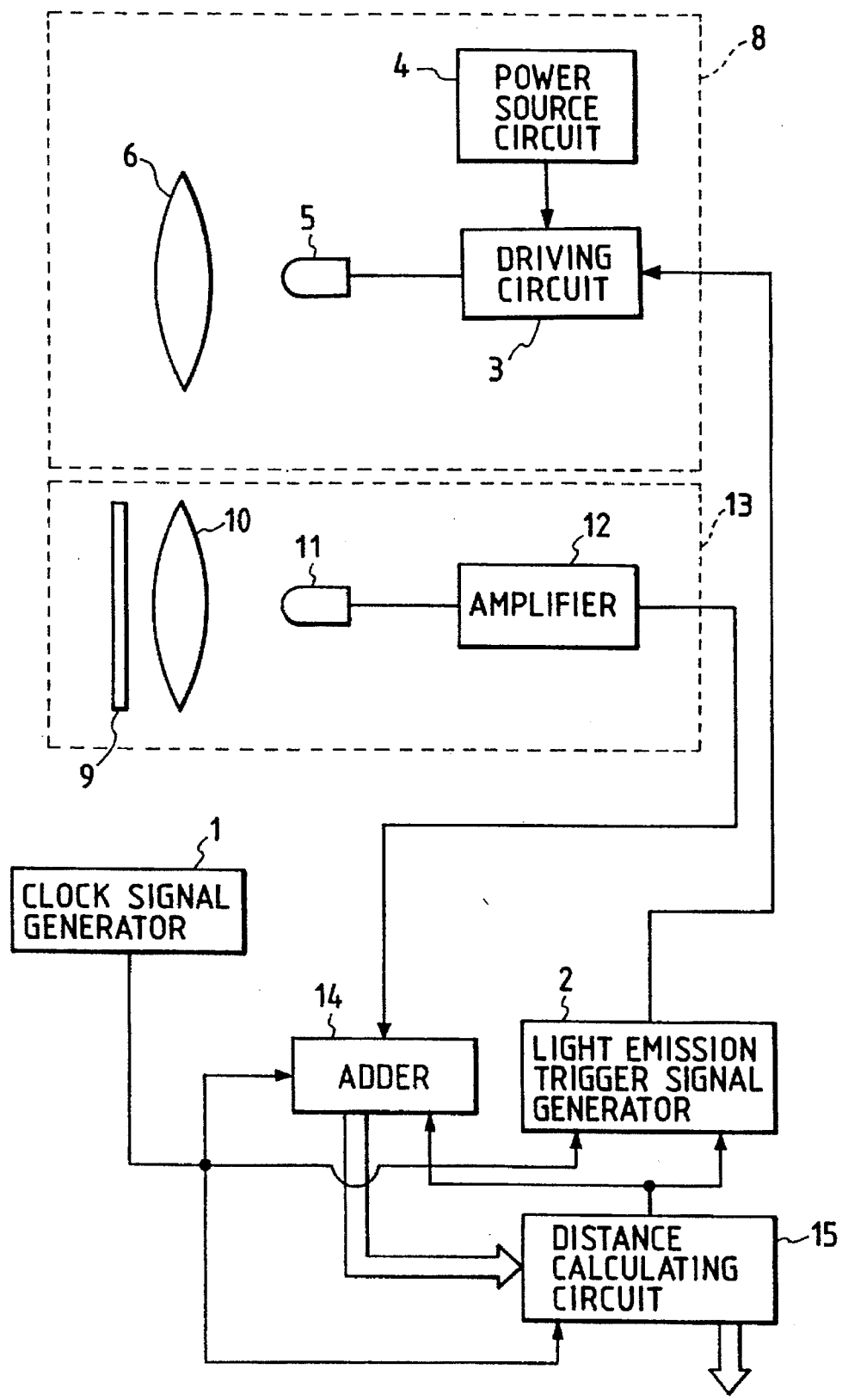
FIG. 7 is a block diagram showing an example of a distance measuring equipment.

Components in FIG. 1 which have the same configuration as or equivalent to that described in conjunction with FIG. 7 are designated by the same reference numerals and their description is omitted. Only the configuration which is different from that of FIG. 7 will be described.

In FIG. 1, reference numeral 3' designates a driving circuit, and 15' designates a distance calculating circuit. In these circuits, the functions described below are added to those of the driving circuit 3 and the distance calculating circuit 15 in the equipment of FIG. 7. Furthermore, a shielded light emitting element 20 is additionally disposed. Specifically, when a correction instruction signal is externally supplied through a terminal X, the distance calculating circuit 15' supplies to the driving circuit 3' a signal for driving only the shielded light emitting element 20 to emit light. Thereafter, the distance calculating circuit 15' outputs a trigger signal, i.e., a light emission start signal. The driving circuit 3' drives the light emitting element 20 to emit light during only the period when the correction instruction signal is supplied through the terminal X (or during a predetermined period after the start of the supply).

The light emitting element 20 is completely enclosed by a light shield member 21 and is the same in kind as the light emitting element 5. The adder 14, the light emission trigger signal generator 2, and the distance calculating circuit 15' may be configured by a hardware. It is a matter of course that these circuits may be configured by a software by using a CPU constituting a microcomputer. This is applicable also to second and third embodiments which will be described later.

Figure 2:
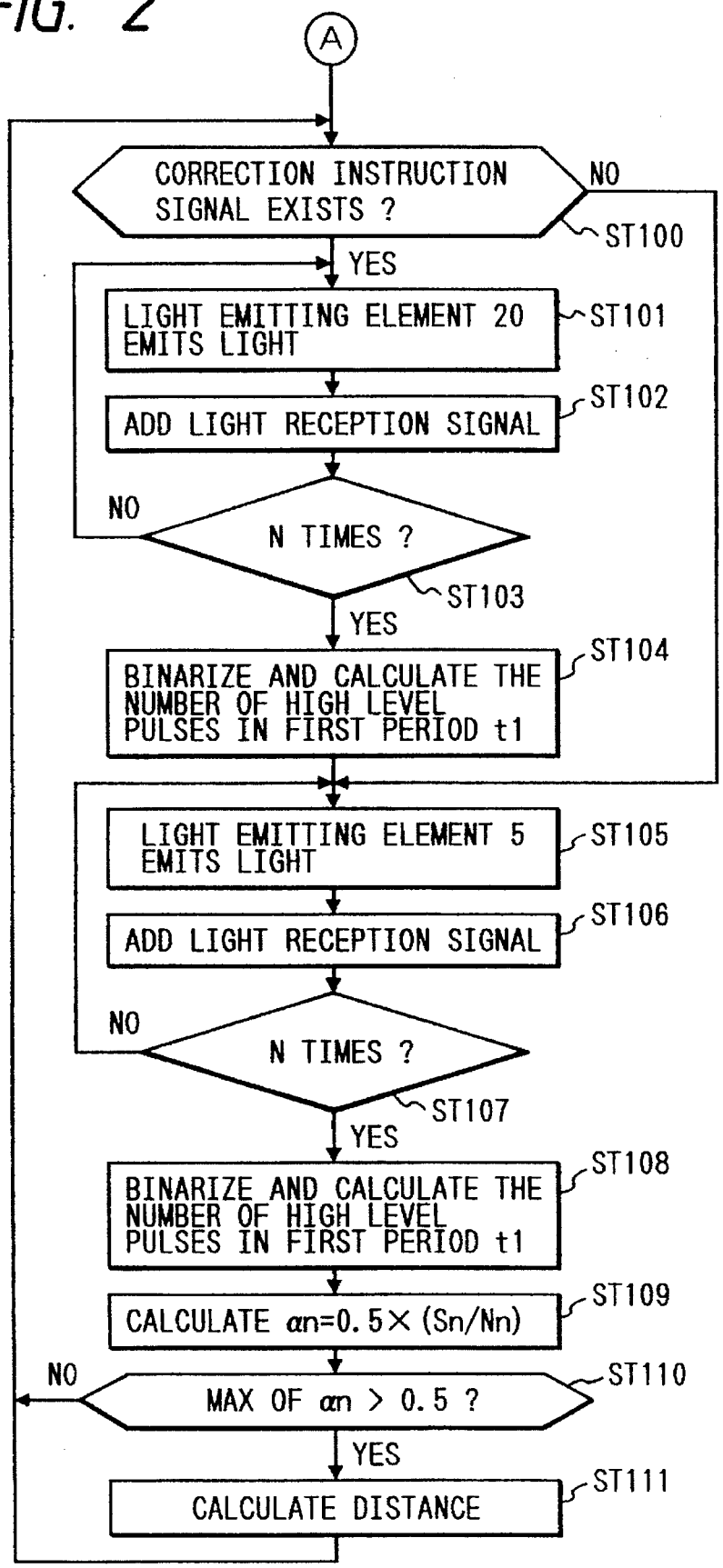
FIG. 2 is a flowchart illustrating the operation of the equipment shown in FIG. 1.

The operation of the above configuration will be described with reference to FIG. 2 on the assumption that the adder 14, the light emission trigger signal generator 2, and the distance calculating circuit 15' are configured by a CPU.

When the power source of the equipment is turned on, the process advances to step ST100. If the correction instruction signal is supplied through the terminal X, steps ST101, ST102 and ST103 are repeatedly executed. Namely, the distance calculating circuit 15' controls the driving circuit 3' so that only the light emitting element 20 for correction is set to be the drive-enabled state, and supplies the light emission start signal to the light emission trigger signal generator 2. The light emission trigger signal generator 2 supplies N times the trigger signals to the driving circuit 3' which in turn drives the light emitting element 20 for correction to emit light N times. The adder 14 divides the output from the amplifier 12 for the predetermined period T (which uses the light emission start signal as the reference) and sequentially adds the waveform of a newly obtained period to the output waveform of the previous period. Since light is not emitted to the outside during this operation, no light reception signal is produced in the portion Q2 due to the light beams reflected from the forward object, and a large DC component is produced only in the portion Q1 due to electric noise (FIG. 8(F)).

In step ST104, the addition result is binarized, and then subjected to a processing in which pulses of a high level are counted in each minute unit period. The count results are stored as Nn (n=0, 1, 2, . . . , m).

Then the process advances to step ST105 in which the light emission trigger signal generator 2 causes the light emitting element 5 for measurement to periodically emit light. This light emission is conducted by repeatedly executing steps ST106 and ST107 in the same manner as that in steps ST102 and ST103. In step ST108, pulses of a high level are counted in each minute unit period in the same manner as step ST104. The count results are stored as Sn (n=0, 1, 2, . . . , m). In this case, light is emitted to the outside, and therefore a DC component is produced in both the portion Q1 due to electric noise and the portion Q2 due to the light beams reflected from the forward object (FIG. 8(B)).

Figure 8A:
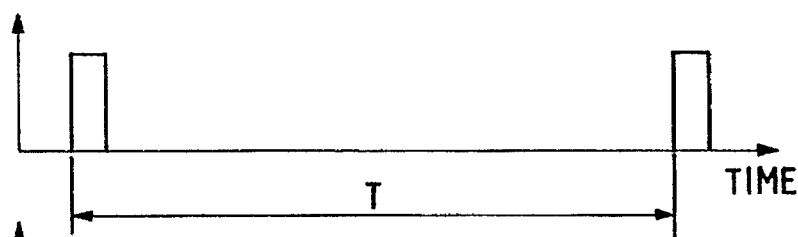
FIGS. 8(A) to 8(F) are waveform charts illustrating the operation of the equipment shown in FIG. 7.
Figure 8B:
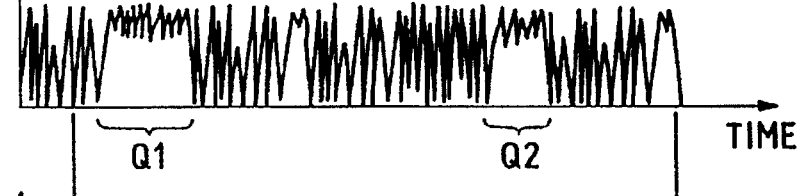
Figure 8C:
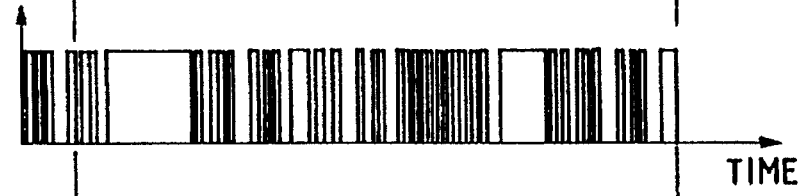
Figure 8D:
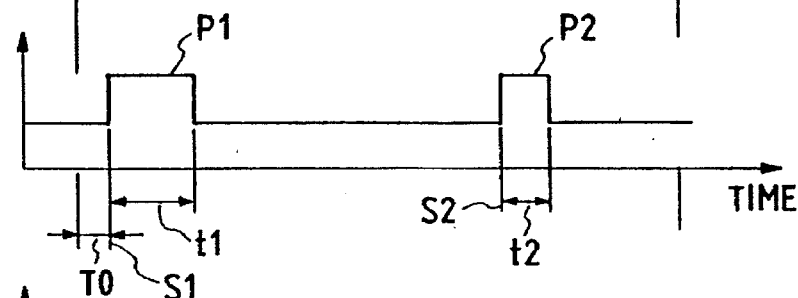

The obtained values Sn (n=0, 1, 2, . . . , m) are subjected in step ST109 to the calculation of αn=0.5×(Sn/Nn) (n=0, 1, 2, . . . , m). According to this calculation, 0.5 is obtained for all periods where Sn and Nn are equal to each other, and a predetermined value is obtained for only a period where Sn is greater than Nn. In other words, the portion Q2 of FIG. 8(B) which is different from the corresponding portion of FIG. 8(F) is extracted to obtain the output of FIG. 8(E).

In step ST110, the value obtained in step ST109 is compared with a predetermined value, for example, 0.5. If the obtained value is equal to or less than the predetermined value, it is judged that the signal is due to noises, and the process returns to step ST100. If the obtained value exceeds the predetermined value, it is judged that the signal includes light beams reflected from the forward object, and the process advances to next step ST111.

Figure 8E:
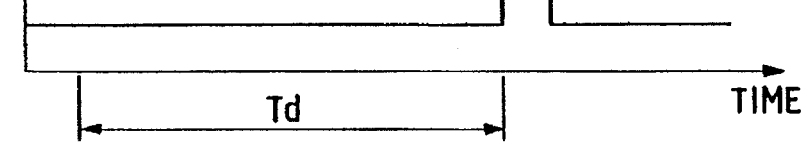
Figure 8F:

In step ST111, on the basis of the light reception signal which has been normalized at a probability that a high level is obtained at each minute period as shown in FIG. 8(E), the period Td is detected which elongates until the instant when the normalized light reception signal in response to the control signal rises to exceed the predetermined value. The distance between the forward object and the equipment is calculated according to the expression of $3\times10^8\times(Td/2)$. Thereafter, the process returns to step ST100.

Second Embodiment

Hereinafter, another embodiment of the invention will be described with reference to FIG. 3.

Figure 3:
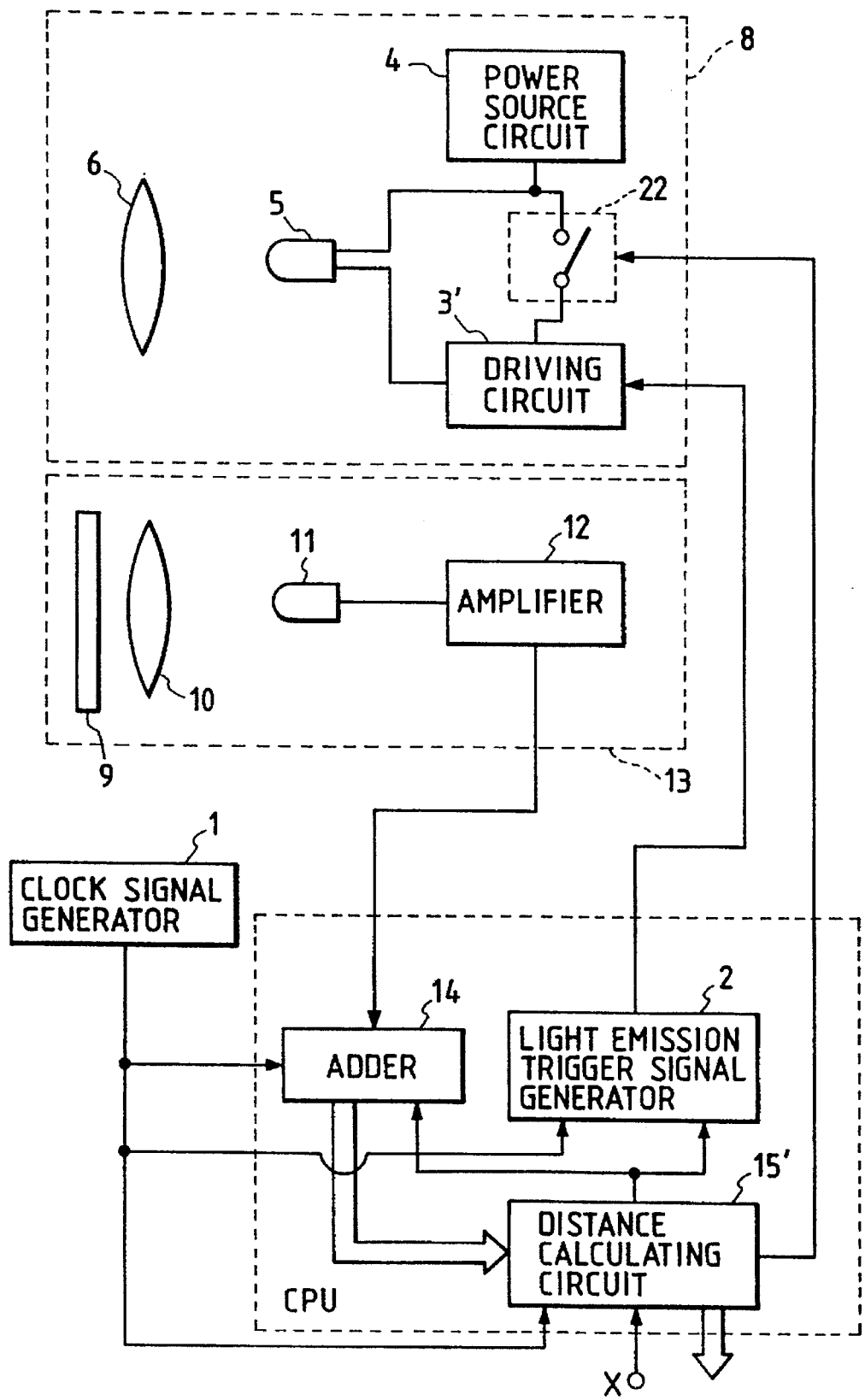
FIG. 3 is a block diagram showing a second embodiment of the invention.

Components in FIG. 3 which have the same configuration as or equivalent to that described in conjunction with FIG. 7 are designated by the same reference numerals and their description is omitted. Only the configuration which is different from that of FIG. 7 will be described.

In FIG. 3, reference numeral 15' designates a distance calculating circuit. In the circuit, the function described below is added to that of the distance calculating circuit 15 in the equipment of FIG. 7. Furthermore, a switch circuit 22 is additionally disposed. Specifically, when a correction instruction signal is externally supplied through a terminal X after the power source of the equipment is turned on, the distance calculating circuit 15' supplies a signal for making the switch circuit 22 turn on (conductive) so that the both terminals of the light emitting element 5 is short-circuited (in an equivalent circuit). Thereafter, the distance calculating circuit 15' outputs a light emission start signal.

Figure 4:
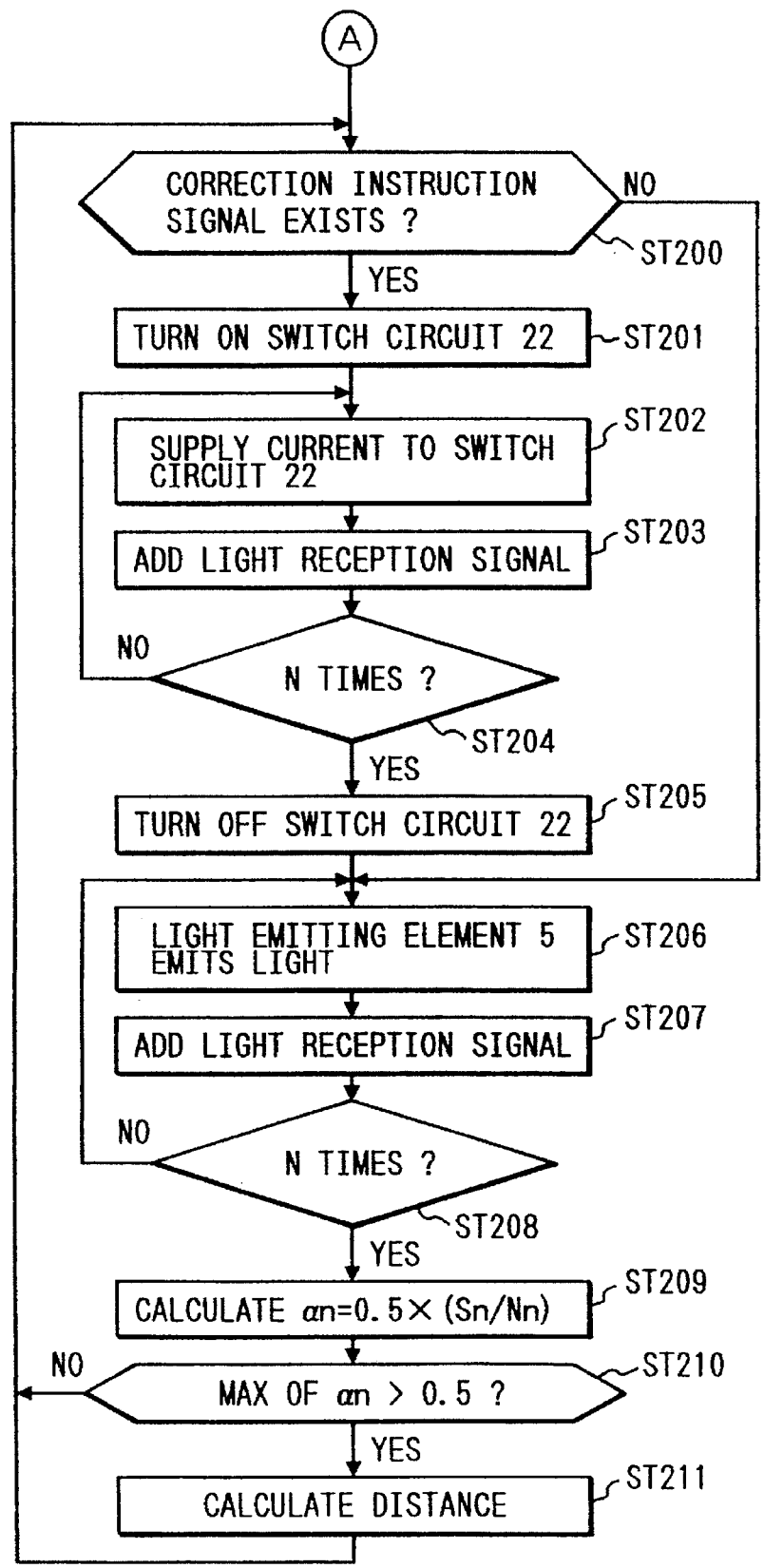
FIG. 4 is a flowchart illustrating the operation of the equipment shown in FIG. 3.

The operation of the above configuration will be described with reference to FIG. 4.

When the power is turned on, the process advances from step A to step ST200. If it is judged that the correction instruction signal is supplied through the terminal X, the distance calculating circuit 15' sets the input and output terminals of the switch circuit 22 to be electrically connected to each other or the on state (step ST201) so that, even when the driving circuit 3' supplies a drive signal to the light emitting element 5, the light emitting element 5 does not emit light, and the current from the power source circuit 4 flows directly into the driving circuit 3'.

Thereafter, the process advances to step ST202 in which the distance calculating circuit 15' supplies the light emission start signal to the light emission trigger signal generator 2, and the light emission trigger signal generator 2 supplies the trigger signal to the driving circuit 3'. The current (which is equal in level to that used in the case where the light emitting element 5 is to be driven) from the power source circuit 4 flows directly into the driving circuit 3' through the switch circuit 22, or without passing through the light emitting element 5.

The adder 14 divides in step ST203 the output from the amplifier 12 for the predetermined period T (which uses the light emission start signal as the reference) and sequentially adds the waveform of a newly obtained period to the output waveform of the previous period (this operation is the same as that shown in FIG. 8(B)).

In step ST204, it is judged whether the processing of steps ST202 and ST203 is repeated N times or not. If the repeat number is less than N, the process returns to step ST202. If the repeat number reaches N, the result is divided in each unit period (which is sufficiently shorter than the period T), and the effective value of the waveform in each period is calculated. The effective values are stored as Nn (n=0, 1, 2, ..., m).

In step ST205, in response to a signal from the distance calculating circuit 15', the input and output terminals of the switch circuit 22 are set to be the off state. This allows the light emitting element 5 to emit light when the light emission start signal is supplied.

Then the process advances to step ST206 in which the light emission trigger signal generator 2 supplies the light emission start signal to the driving circuit 3' so that the light emitting element 5 emits light. The light reception signal is processed in step ST207 in the same manner as step ST203. Specifically, in step ST207, the addition result is divided in each unit period which is sufficiently shorter than the period T, and the effective value of the waveform in each period is calculated in the same manner as step ST203. The effective values are stored as Sn (n=0, 1, 2, ..., m). In step ST208, thereafter, the same process as that of step ST204 is conducted.

In step ST209, the stored effective values which has been divided in each unit period or the effective values of the first periods are sequentially subjected to a division operation, and the division result is multiplied by a coefficient of 0.5. In other words, the calculation of $\alpha n = 0.5 \times (Sn/Nn)$ (n=0, 1, 2, ..., m) is done.

In step ST210, the maximum value of the values $\alpha n$ which have been obtained in step ST209 for each unit value is compared with a predetermined value, for example, 0.5. If the maximum value is less than the predetermined value, it is judged that the signal is due to noise, and the process returns to step ST200. If the maximum value exceeds the predetermined value, it is judged that the signal includes light beams reflected from the forward object, and the process advances to next step ST211.

If the maximum value exceeds in step ST210 the predetermined value, on the basis of the light reception signal which has been normalized at a probability that a high level is obtained at each minute period as shown in FIG. 8(E), the period Td is detected which elongates until the instant when the normalized light reception signal in response to the control signal rises to exceed the predetermined value. The distance between the forward object and the equipment is calculated according to the expression of $3 \times 10^8 \times (Td/2)$. Thereafter, the process returns to step ST200.

If the correction instruction signal is not supplied through the terminal X in step ST200, it is judged that the value Nn has been already calculated, and the process jumps to step ST205.

Third Embodiment

Hereinafter, still another embodiment of the invention will be described with reference to FIG. 5.

Figure 5:
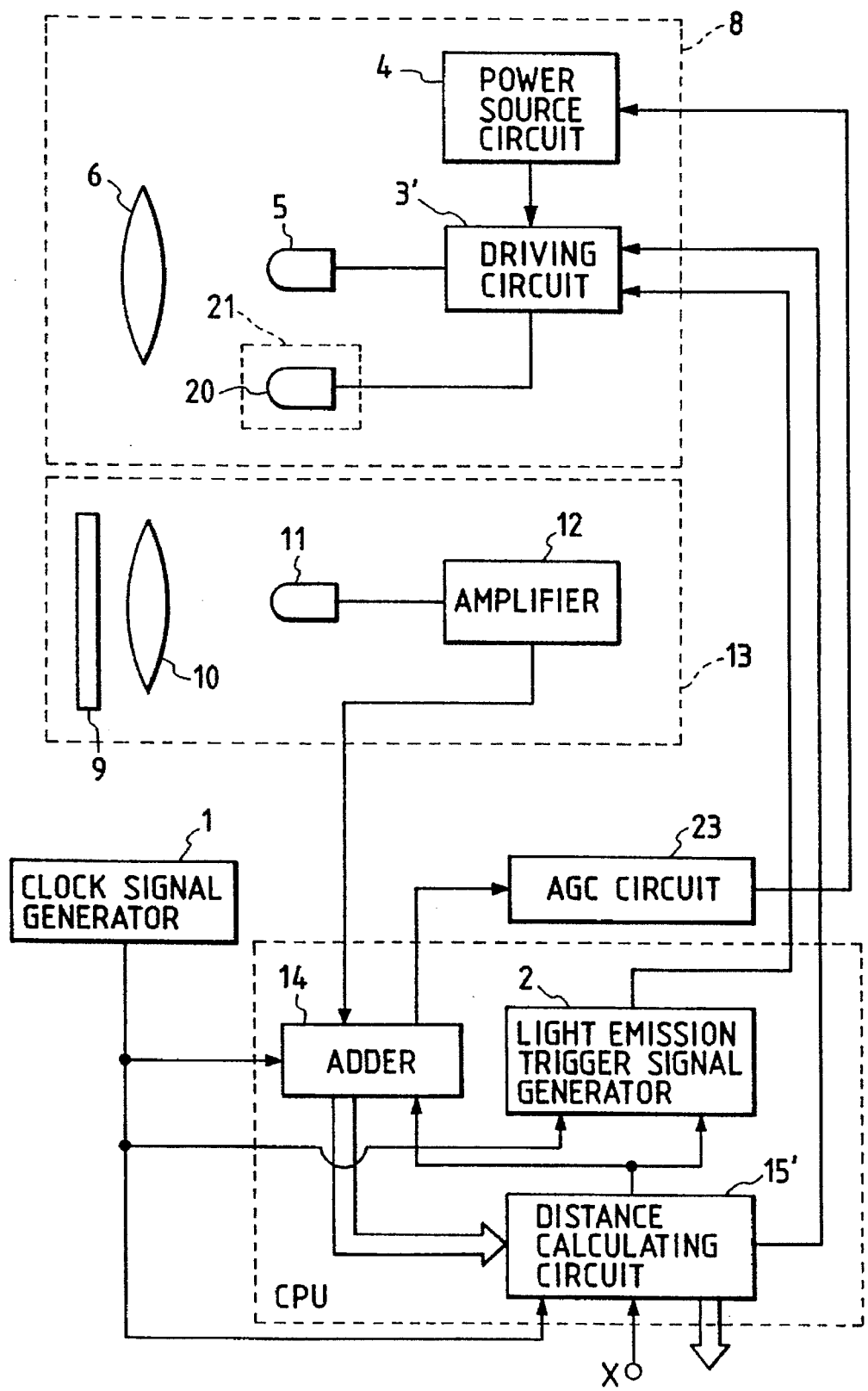
FIG. 5 is a block diagram showing a third embodiment of the invention.

Components in FIG. 5 which have the same configuration as or equivalent to that described in conjunction with FIG. 7 are designated by the same reference numerals and their description is omitted. Only the configuration which is different from that of FIG. 7 will be described.

In FIG. 5, reference numeral 3' designates a driving circuit, and 15' designates a distance calculating circuit. In these circuits, the functions described below are added to those of the driving circuit 3 and the distance calculating circuit 15 in the equipment of FIG. 7. Furthermore, a shielded light emitting element 20 and an automatic gain control (AGC) circuit 23 are additionally disposed. Specifically, when a correction instruction signal is externally supplied through a terminal X, the distance calculating circuit 15' supplies to the driving circuit 3' a signal for driving only the shielded light emitting element 20 to emit light. Thereafter, the distance calculating circuit 15' outputs a light emission start signal. The driving circuit 3' can drive the light emitting element 20 to emit light during only the period when the correction instruction signal is supplied, in accordance with the light emission start signal which is a trigger signal from the light emission trigger signal generator 2. The light emitting element 20 is completely enclosed by a light shield member 21 so that light emitted in the light emitting operation is prevented from leaking through the light transmitting lens 6. The light emitting element 20 is the same in kind as the light emitting element 5. The AGC circuit 23 controls the voltage supplied to the driving circuit 3' from the power source circuit 4 so as to control the emission outputs of the light emitting elements 20 and 5.

Figure 6:
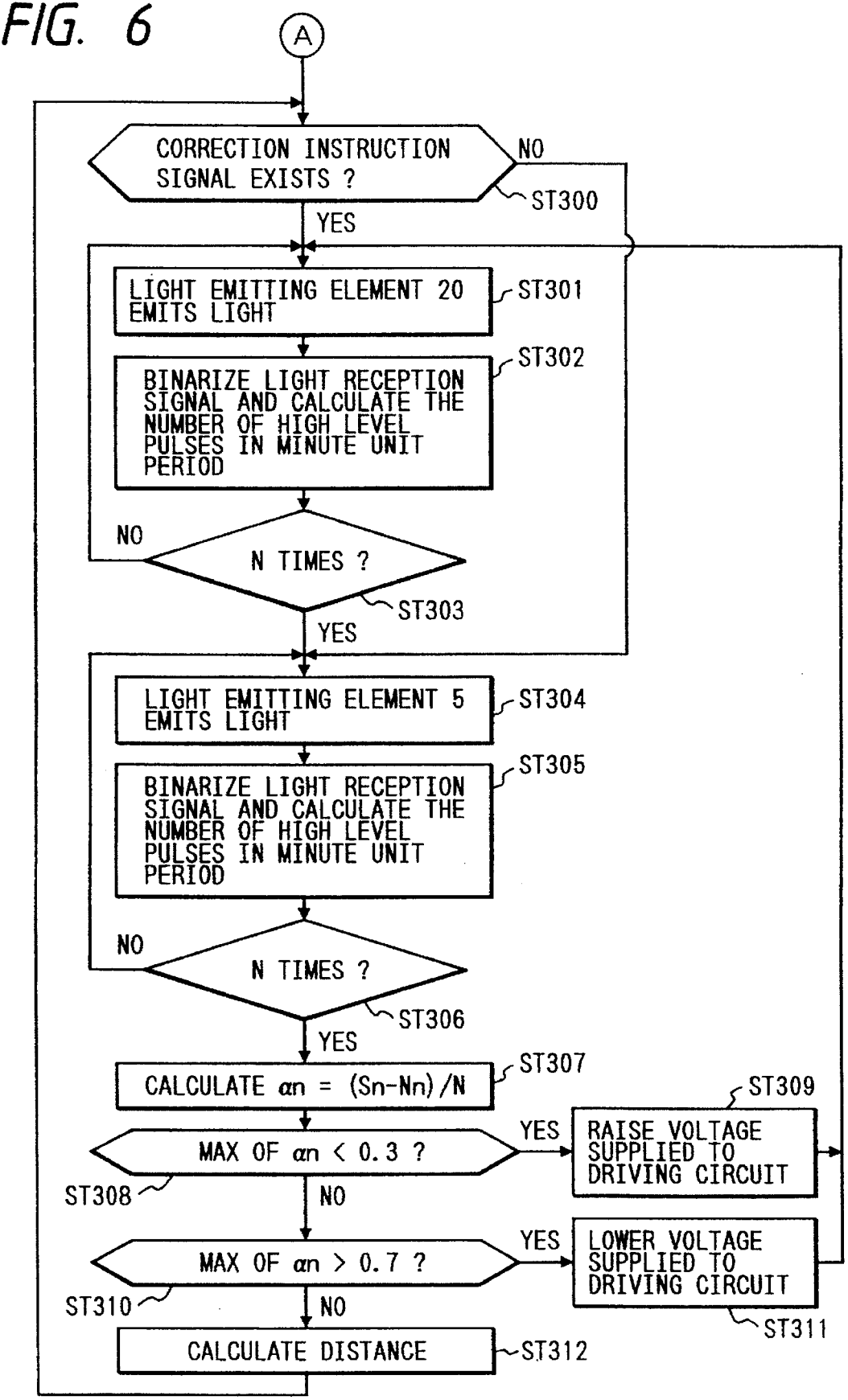
FIG. 6 is a flowchart illustrating the operation of the equipment shown in FIG. 5.

The operation of the above configuration will be described with reference to FIG. 6.

When the power source of the equipment is turned on, the process advances from step A to step ST300. When the correction instruction signal is supplied through the terminal X, the process further advances to step ST301 in which the distance calculating circuit 15' controls the driving circuit 3' so that only the light emitting element 20 for correction is set to be the drive-enabled state. The distance calculating circuit 15' supplies the light emission start signal to the light emission trigger signal generator 2, and the light emission trigger signal generator 2 supplies the trigger signal to the driving circuit 3' at intervals of the period T. As a result, the driving circuit 3' drives the light emitting element 20 for correction to emit light at intervals of the period T.

After the light emitting element 20 emits light in step ST301, the process advances to step ST302. In step ST302, the adder 14 binarizes the output of the amplifier 12 with using a reference value of a predetermined level as the threshold, and counts pulses of a high level in each minute unit period (n=0, 1, 2, ..., m). The count results are temporarily stored. In other words, the multiplication factor of a period which has a high level as a result of the binarization with respect to the minute unit period is calculated, and the calculation results are temporarily stored.

The processing of steps ST301 and ST302 is repeated N times by passing through next step ST303. The final count results are stored as Nn (n=0, 1, 2, ..., m).

Then the process advances to step ST304 in which the trigger signal from the light emission trigger signal generator 2 causes the light emitting element 5 for measurement to emit light at intervals of the period T. Signals due to light received by the light receiving element 11 are supplied to the adder 14 via the amplifier 12. In step ST305, pulses of a high level are counted in each minute unit period in the same manner as step ST302. The count results Sn (n=0, 1, 2, ..., m) are temporarily stored at each time. After the processing of steps ST304 and ST305 is repeated N times, the process advances through step ST306 to step ST307.

In step ST307, the calculation of $\alpha' n = (Sn/Nn)/N$ (n=0, 1, 2, ..., m) is done on the calculated values Sn and Nn.

In step ST308, the maximum value of the values $\alpha' n$ which has been obtained in step ST307 is compared with a predetermined value, for example, 0.3. If the maximum value is less than the predetermined value, a signal instructing the power source circuit 4 to raise the voltage supplied to the driving circuit 3' is issued from the AGC circuit 23 in step ST309. Thereafter, the process returns to step ST301. In other words, in this case, it is judged that the distance between the forward object and the equipment is long so that the emission outputs of the light emitting elements 20 and 5 is raised.

If the maximum value of α'n is greater than the predetermined value of 0.3 in step ST308, the process advances to step ST310 in which the maximum value of α'n is compared with another predetermined value, for example, 0.7. If the maximum value is greater than the predetermined value, a signal instructing the power source circuit 4 to lower the voltage supplied to the driving circuit 3' is issued from the AGC circuit 23 in step ST311. Thereafter, the process returns to step ST301. In other words, in this case, it is judged that the distance between the forward object and the equipment is short so that the emission outputs of the light emitting elements 20 and 5 is lowered.

If the maximum value of α'n is in the range between predetermined values, for example, 0.3 to 0.7 ($0.3 \leq \alpha'n \leq 0.7$) in step ST310, it is judged that the signal includes light beams reflected from the forward object, and the process advances to next step ST312.

In step ST312, the waveform binarized as shown in FIG. 8(C) is calculated on the basis of the periods of a high level per minute unit period, or in other words the multiplication factor of a period which has a high level with respect to the minute unit period is calculated. The period Td is calculated which elongates from the timing of rising of the trigger signal functioning as the light emission start signal to the timing of rising of the light reception signal. The distance is calculated according to the expression of $3 \times 10^8 \times (Td/2)$, and the process then returns to step ST300. According to the distance measuring equipment of this embodiment, since the emission outputs of the light emitting elements 20 and 5 are controlled by the AGC circuit 23, the measurement of a distance is performed with a higher accuracy.

In the first to third embodiments described above, the correction instruction signal is externally supplied to the terminal X. Alternatively, the correction instruction signal may automatically be produced by the distance calculating circuit 15' (or the corresponding function of a microcomputer) when the power source of the equipment is turned on. It is a matter of course that, in the alternative, steps ST100, ST200 and ST300 in the flowcharts of the embodiments are eliminated.

As described above, the invention can attain an effect that the accuracy of measuring a distance can be improved by configuring the equipment so as to perform simple signal processing at a reduced cost.

What is claimed is:

1. A distance measuring equipment comprising:
   a first light emitting element for measurement;
   an optically shielded second light emitting element for use during a correction mode;
   timing means for generating a timing signal;
   light emission trigger signal generating means for receiving the timing signal from said timing means and for generating a trigger signal in response to said timing signal;
   driving means for receiving the trigger signal from said light emission trigger signal generating means to selectively drive said first and second light emitting elements to emit light;
   a light receiving element for receiving light emitted from said first light emitting element for measurement and reflected by a forward object during a measurement mode;
   adding means for conducting an adding operation on an output signal delivered from said light receiving element, said adding operation occurring a predetermined number of times during a period between reception of subsequent timing signals from said timing means, and for binarizing and normalizing an addition result of said adding operation; and
   distance calculating means for calculating a distance between said equipment and said forward object on the basis of a signal supplied from said adding means and the timing signal from said timing means,
   wherein said timing means drives said optically shielded light emitting element during said correction mode to emit light, and thereby generate a correction signal, and wherein said correction signal is utilized by said adding means to correct said output signal delivered from said light receiving element.

2. The distance measuring equipment according to claim 1, further comprising a light transmitting lens for diffusing light away from said light emitting element for measurement at a predetermined angle, and a light receiving lens for converging light reflected by the forward object into said light receiving element.

3. The distance measuring equipment according to claim 2, further comprising a honeycomb filter, which is disposed so as to cover a front surface of an incident plane of said light receiving lens, for allowing only light which is parallel to an optical axis of said light receiving lens to pass through said lens, among the light reflected by the forward object.

4. The distance measuring equipment according to claim 1, wherein said second light emitting element for correction is driven to emit light before said first light emitting element for measurement is driven to emit light.

5. The distance measuring equipment according to claim 1, wherein a value an is calculated by a predetermined expression on the basis of first count results Nn (n=0, 1, 2, ..., m) (m is a positive integer) obtained by counting first selected pulses for a unit period during said correction mode and second count results Sn (n=0, 1, 2, ..., m) obtained by counting second selected pulses for said unit period during said measurement mode, and the distance between said equipment and said forward object is calculated only when the value an exceeds a predetermined value.

6. The distance measuring equipment according to claim 1, further comprising gain control means for controlling emission outputs of said light emitting element for measurement and said light emitting element for correction on the basis of the signal as corrected by the correction signal.

7. The distance measuring equipment according to claim 6, wherein a value α'n is calculated by a predetermined expression on the basis of first count results Nn (n=0, 1, 2, ..., m) (m is a positive integer) obtained by counting first selected pulses for a unit period during said correction mode and second count results Sn (n=0, 1, 2, ..., m) obtained by counting second selected pulses for said unit period during said measurement mode, and wherein emission outputs of said first light emitting element for measurement and said second light emitting element for correction are lowered or raised by said gain control means when the value α'n is out of a predetermined range, and the distance between said equipment and said forward object is calculated when the value α'n is in the predetermined range.

8. A distance measuring equipment comprising:
   a light emitting element;
   driving means for intermittently driving said light emitting element;
   switch means which is electrically connected in parallel to said light emitting element;

timing means for generating a timing signal;

light emission trigger signal generating means for supplying the timing signal from said timing means to said driving means as a trigger signal;

a light receiving element for receiving light emitted from said light emitting element and reflected by a forward object;

adding means for conducting an adding operation on an output signal including the light reception signal from said light receiving element when receiving a plurality of timing signals supplied from said timing means, and for binarizing and normalizing an addition result; and distance calculating means for calculating a distance between said equipment and said forward object on the basis of a signal supplied from said adding means and the timing signal output from said timing means, wherein said switch means is switched to be conductive in synchronization with the adding operation of said adding means, thereby setting said light emitting element to a non-light emitting state, and wherein a signal received from said light receiving element is corrected by a correction signal generated when said light emitting element is in said non-light emitting state.

9. The distance measuring equipment according to claim 8, further comprising a light transmitting lens for diffusing light away from said light emitting element for measurement at a predetermined angle, and a light receiving lens for converging light reflected by the forward object into said light receiving element.

10. The distance measuring equipment according to claim 9, further comprising a honeycomb filter, which is disposed so as to cover a front surface of an incident plane of said light receiving lens, for allowing only light which is parallel to an optical axis of said light receiving lens to pass through said lens, among the light reflected by the forward object.

11. The distance measuring equipment according to claim 8, wherein said switch means is set to be conductive before said light emitting element is driven to emit light.

12. The distance measuring equipment according to claim 8, wherein a value $\alpha n$ is calculated by a predetermined expression on the basis of first count results $Nn$ ($n=0, 1, 2, \ldots, m$) (m is a positive integer) obtained by counting first selected pulses for a unit period during said non-light emitting state and second count results $Sn$ ($n=0, 1, 2, \ldots, m$) obtained by counting second selected pulses for said unit period when said light emitting element is driven to emit light, and the distance between said equipment and said forward object is calculated only when the value an exceeds a predetermined value.

* * * * *